United States Patent [19]

Lambert et al.

[11] 4,207,935
[45] Jun. 17, 1980

[54] FLYWHEEL-OPERATED TOY WOODWORKING APPARATUS

[75] Inventors: Gerard L. Lambert, Torrance; John S. Cook, Redondo Beach, both of Calif.

[73] Assignee: Mattel, Inc., Hawthorne, Calif.

[21] Appl. No.: 924,119

[22] Filed: Jul. 13, 1978

[51] Int. Cl.² .................... B27C 9/00; A63H 33/30
[52] U.S. Cl. ...................................... 144/1 R; 74/25; 46/39; 83/205; 83/620; 144/1 H
[58] Field of Search ................. 46/39, 40; 144/1 R, 144/1 B, 1 H; 83/524, 620, 622, 205; 51/5 R, 167, 134.5 R, 257; 74/22 A, 25

[56] References Cited

U.S. PATENT DOCUMENTS

| | | | |
|---|---|---|---|
| 399,066 | 3/1889 | McMillan | 51/167 |
| 453,363 | 6/1891 | Saurbrey | 83/524 K |
| 1,474,852 | 11/1923 | Ryback | 46/39 |
| 2,913,025 | 11/1959 | Richards | 144/1 B |
| 3,071,889 | 1/1963 | Silver | 46/39 |
| 3,128,805 | 4/1964 | Silver | |
| 3,168,849 | 2/1965 | Zilg et al. | |
| 3,998,254 | 12/1976 | Morin | |
| 4,118,886 | 10/1978 | Bartoo | 46/39 |

FOREIGN PATENT DOCUMENTS 486636  11/1929  Fed. Rep. of Germany .......... 51/134.5

Primary Examiner—Travis S. McGehee
Assistant Examiner—W. D. Bray
Attorney, Agent, or Firm—John G. Mesaros; Max E. Shirk; Ronald M. Goldman

[57] ABSTRACT

A toy woodworking apparatus powered by a flywheel driven by a handle operatively coupled to a gear train through a ratchet mechanism, the gear train driving a sander disc, rotary slitter blades and a combined shear and punch member, the shear member being coupled to the drive train through a single-cycle coupling mechanism. The apparatus performs woodworking operations on wood slats or strips.

12 Claims, 8 Drawing Figures

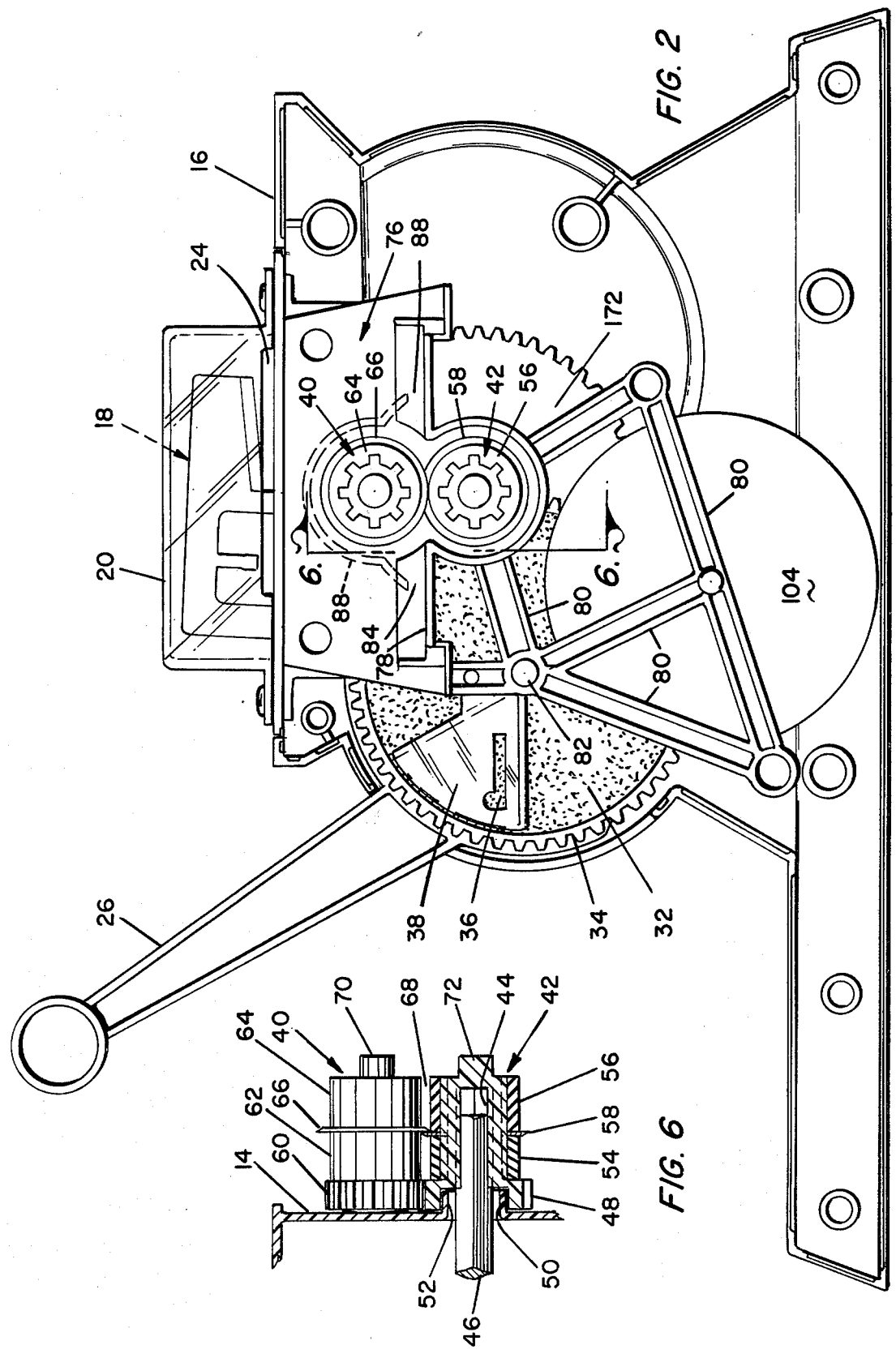

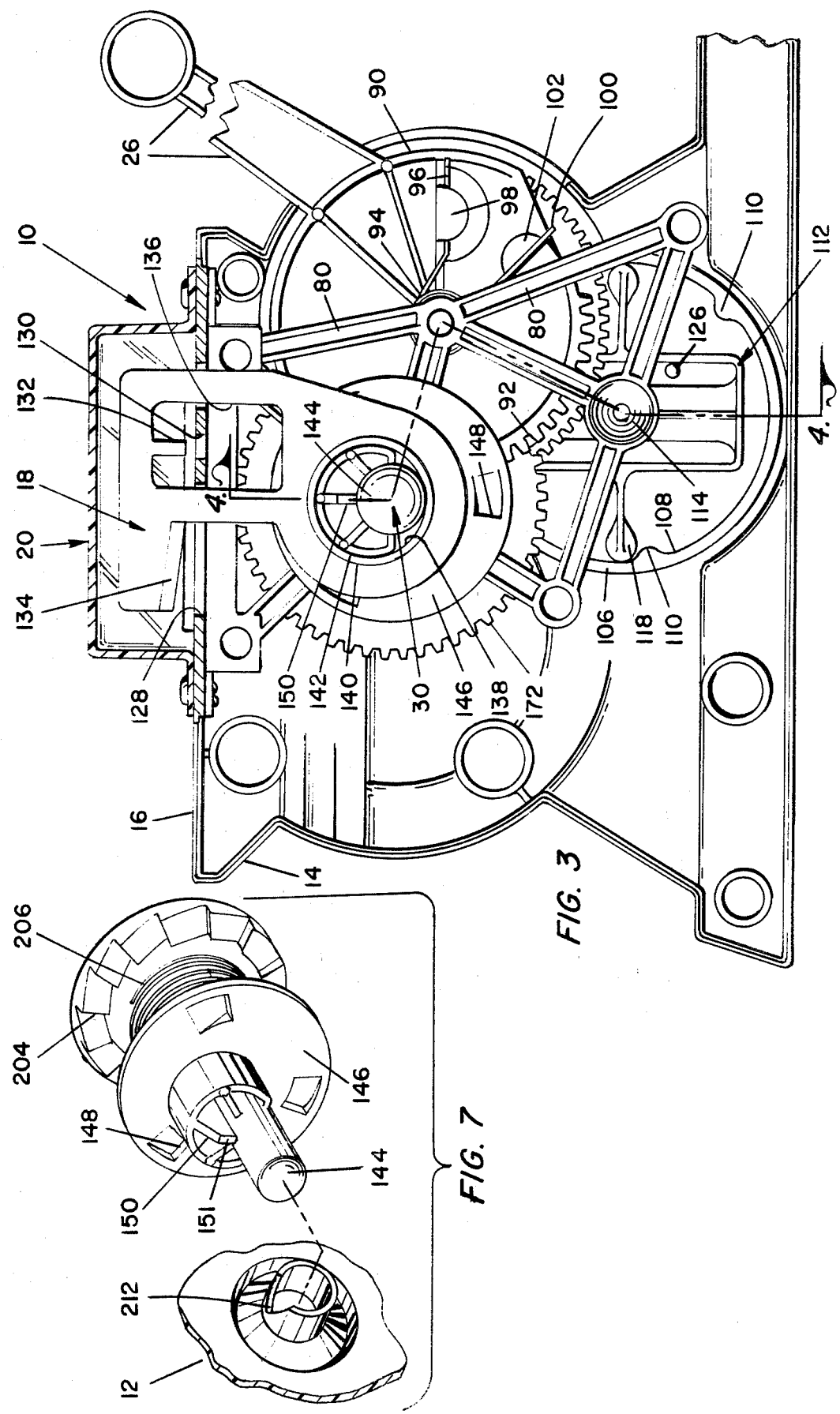

FLYWHEEL-OPERATED TOY WOODWORKING APPARATUS

BACKGROUND OF THE INVENTION

The background of the invention will be discussed in two parts:

1. Field of the Invention

This invention relates to toys and more particularly to a flywheel-powered toy woodworking apparatus.

2. Description of the Prior Art

Toys simulating woodworking apparatus normally found in a home shop provide amusement to children. Representative of the toy woodworking apparatus are U.S. Pat. No. 3,071,889 which is a convertible wood-type machine shop toy which is motor driven for performing say cutting and turning operations on plastic foam or the like; U.S. Pat. No. 3,128,805 which is an electric motor-driven convertible wood machine shop toy for performing cutting or turning operations; U.S. Pat. No. 3,168,849 which is a toy punch machine; and U.S. Pat. No. 1,474,852 which is a mechanical toy simulating a man at work. The first two of the above-mentioned patents require assembly, disassembly and reconfiguration of the parts thereof to enable the toy to be fully appreciated in performing the various operations. The toy punch machine patent referenced above is a single purpose hand-operated machine.

A compact multi-purpose power machine is shown and described in U.S. Pat. No. 3,998,254, such patent being assigned to the assignee of the instant invention. With this device, all working tool parts are contained within the housing and suitably recessed to prevent access to the tool surfaces by fingers of the user, the housing being provided with deep narrow slots for passage therethrough of the workpiece, usually in the form of a sheet or slab of working material such as wood, plastic or the like. By providing several different cutting tools within the housing, a variety of cutting operations may be performed. The machine is motor driven by means of an electrical motor.

It is an object of the present invention to provide a new and improved toy woodworking apparatus.

It is another object of the present invention to provide a new and improved toy woodworking apparatus operated by an inertia wheel or flywheel.

It is a further object of the present invention to provide a toy woodworking apparatus which is flywheel operated for performing shearing, punching, slitting and sanding operations on slats of wood or the like.

SUMMARY OF THE INVENTION

The foregoing and other objects of the invention are accomplished by providing a housing having pivotally secured thereto a handle coupled through a gear train to a drive member for operating a flywheel. The handle is coupled through a ratchet mechanism to enable repeated strokes of the handle to accelerate the flywheel. The gear train is provided for being driven by the flywheel with one gear of the gear train having a sanding disc bond to one surface thereof, the sanding disc being accessible through a slot in a side of the housing. The gear train operates counter rotating slitter members which slit slats of wood or the like when passing therethrough. A combined shear and punch member is operatively connected to an eccentric member which is manually depressible inwardly for rotation by a clutch mechanism operated by the gear train, the manually depressible member being spring biased outwardly and configured for coacting with a cam surface formed within the housing to control reciprocation of the member to one cycle for one depression. The cutting components are suitably shielded to prevent harm to the user.

Other objects, features and advantages of the invention will become apparent from a reading of the specification when taken in conjunction with the drawings in which like referenced numerals refer to like elements in the several views.

BRIEF DESCRIPTION OF THE DRAWINGS

FIG. 2 is a side elevation of the apparatus of FIG. 1 as viewed from the opposite side thereof with a housing half removed to show inner components;

FIG. 3 is a side elevational view showing the side opposite that of FIG. 2 with a housing half removed to show the inner components;

FIG. 6 is a side elevational view of the rotary slitter portion, partially in cross section, as viewed along line 6—6 of FIG. 2;

FIG. 7 is an exploded perspective view of the shear blade operating components.

DESCRIPTION OF THE PREFERRED EMBODIMENT

Figure 1:
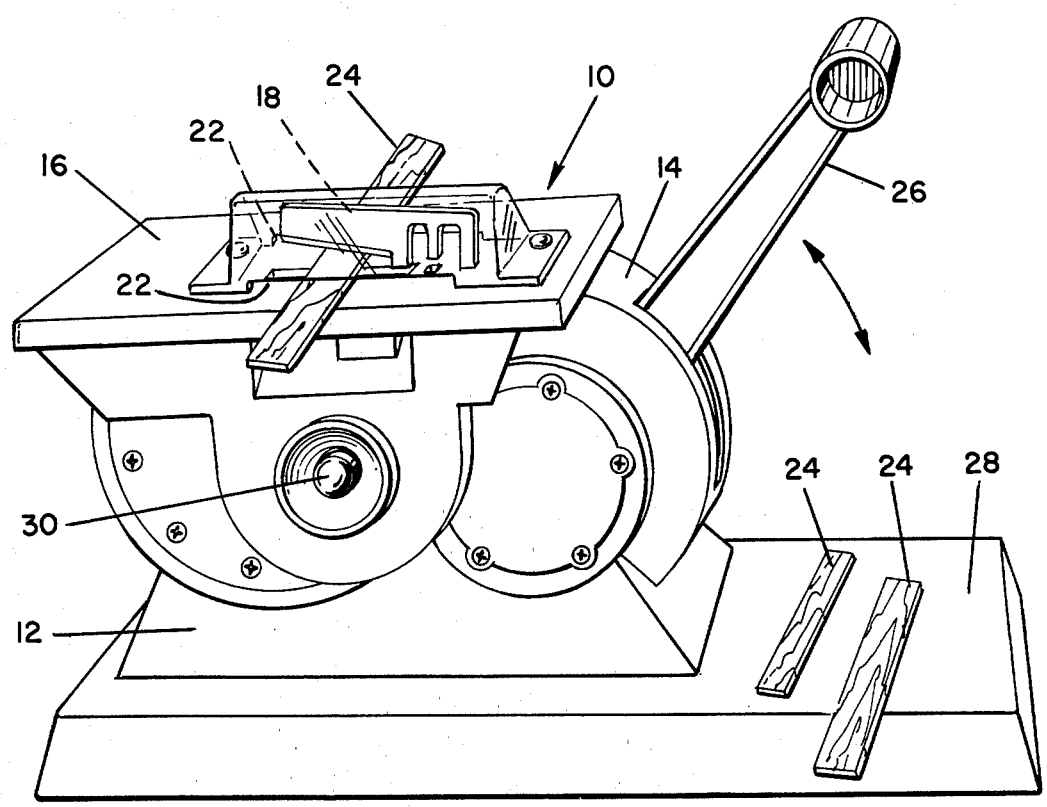
FIG. 1 is a perspective view of the toy woodworking apparatus according to the invention.

Referring now to the drawings and particularly to FIG. 1 there is shown a toy woodworking apparatus generally designated 10 having a housing formed in two halves 12 and 14, the housing being configured to resemble a table saw or the like. The housing is provided with a working tabletop surface 16 through which extends a reciprocating combined shear and punch member 18 encircled by a suitable transparent shield 20 with elongate slots or openings 22 and adjacent the surface 16 for passage therethrough of a suitable workpiece such as a slat 24 configured in the form of a tongue depressor or the like. The slat 24 may be made of wood or other suitable material such as plastic or cardboard. The apparatus 10 as will hereinafter be described is flywheel powered by means of repeated actuation of a crank 26 pivotally coupled within the housing and operatively connected to operate the flywheel. The handle or crank 26 is depressed downwardly in the direction of the arrow adjacent thereto and returns upwardly by means of a spring bias within the housing. The two housing halves 12 and 14 are configured to provide a base portion 28 of suitable dimension for resting on a surface and providing stability during operation of the apparatus 10. The shear and punch member 18, as will hereinafter be discussed, is coupled to a gear train within the housing halves 12 and 14 and operated on a single-cycle basis by manual depression of a button 30 located on the side of housing half 12.

As viewed from the opposite side, as shown in FIG. 2, the housing half 14 has been removed to illustrate the inner components which include a sanding disc 32 suitably affixed or bonded to a surface of a gear member, access to the sanding disc 32 being provided by means of an elongate slot 36 formed in a transparent planar shield member 38 which is secured to the housing half 14. An additional woodworking operation is capable of being performed by means of counter rotating rotary slitting members generally designated 40 and 42. As also illustrated in FIG. 6, the lower rotary slitting member 42 is provided with a main body portion having a square aperture 44 formed therein for engaging a square drive shaft 46 rotatably mounted within the housing. One end of the main body portion is provided with an enlarged gear portion 48 adjacent housing half 14, the gear portion 48 having an enlarged circular aperture formed therein for engaging a boss 52 formed on the side of housing 14. Encircling the outer periphery of the main body portion of rotary slitter member 42 are flexible sleeve members 54 and 56 having positioned therebetween an annular washer-like cutter blade 58 which may be suitably beveled about the periphery thereof. The upper rotary cutting member 40 is configured generally identical to the lower member 42 and is provided with a gear portion 60 in meshing engagement with the gear portion 48 of the lower rotary slitter member 42. Similarly, the outer surface is encircled by flexible sleeves 62 and 64 holding captive therebetween an annular washer-like cutting member 66 in lapping relation with the lower cutting member 58. The outer periphery of sleeve members 54 and 56 is displaced relative to the outer periphery of sleeve member 62 and 64 a distance sufficient to form a gap 68 through which a slat 24 may be passed for performing a slitting operation. Each of the rotary slitting members 40 and 42 is provided with an outwardly extending shaft portion 70 and 72 respectively for engaging mating bosses (not shown) on the interior surface of housing half 14. As better illustrated in FIG. 2, the sleeve members such as sleeve 56 and sleeve 64 have a splined inner configuration for engaging the splined main body portion of rotary slitting members 42 and 40 respectively.

The components within the housing halves 12 and 14 are initially mounted on a framework generally designated 76 to permit the operative parts to be coupled together as a unit or module with the housing halves 12 and 14 then being inserted thereover and suitably secured. The framework 76 contains as an integral part a slitter work surface 78 which is generally planar and adapted to guide the slat 24 through the overlapping slitter blades 58 and 66 with the sleeve members frictionally engaging the slat 24 to thereby drive it for the slitting operation. The framework 76 also includes additional arm portions 80, the intersections of which are suitably configured for mounting to opposing housing halves 12 and 14 or suitably provided with apertures for receiving shafts such as shaft 82 which provides the pivot axis for the gear member 34 to which the sanding disc 32 is attached. The housing half 14 is suitably configured to provide slots 84 and 86 between the slitting surface 78 and the housing portion 88 shown in dotted line encircling upper rotary slitter member 40. The openings 22 and 24 formed in the shield 20, the slot 36 formed in the sander disc shield 38, and the slots 84 and 86 associated with the rotary slitter are large enough for the insertion of slats 24 but small enough to preclude the entry of fingers of the user.

Referring now to FIG. 3, the apparatus 10 is illustrated from the side opposite that of FIG. 2 with the cover half 12 removed to illustrate the inner components. The handle 26 is rotatably coupled about a shaft 82, the handle 26 having an integral enlarged generally disc-shaped portion 90 with gear teeth 94 about a portion thereof. The handle 26 is biased in a counterclockwise direction by means of a torsion spring 92 encircling the shaft 82 and having one end 96 thereof retained by a tab 98 formed integrally with the disc-shaped portion 90, the other end 100 of torsion spring 94 abuttingly engaging a tab 102 formed integrally with one leg 80 of the skeletal framework 76.

Rotatably coupled within the lower portion of the housing half 14 is a flywheel generally designated 104, the flywheel being generally cup-shaped and having an enlarged peripheral flange 106 with an inner circular recess 108, the flange 106 having three radially inwardly extending ridge portions 110 (only two of which are shown). The flywheel 104, as will be discussed hereinafter in more detail, is driven by a flywheel coupling device generally designated 112 which, briefly, is mounted for rotation about shaft 114 which is the axis of rotation of flywheel 104. The flywheel coupling device 112 has an integral pinion portion 116 which is coupled for operation through the gear train, the device 112 being generally rectangular in form and having a pair of diametrically extending tongue portions 118 having enlarged edges adapted for abuttingly engaging one ridge portion 110, and for resiliently deforming to pass over the ridge portion 110 when undue stress is placed on the system.

Figure 5:
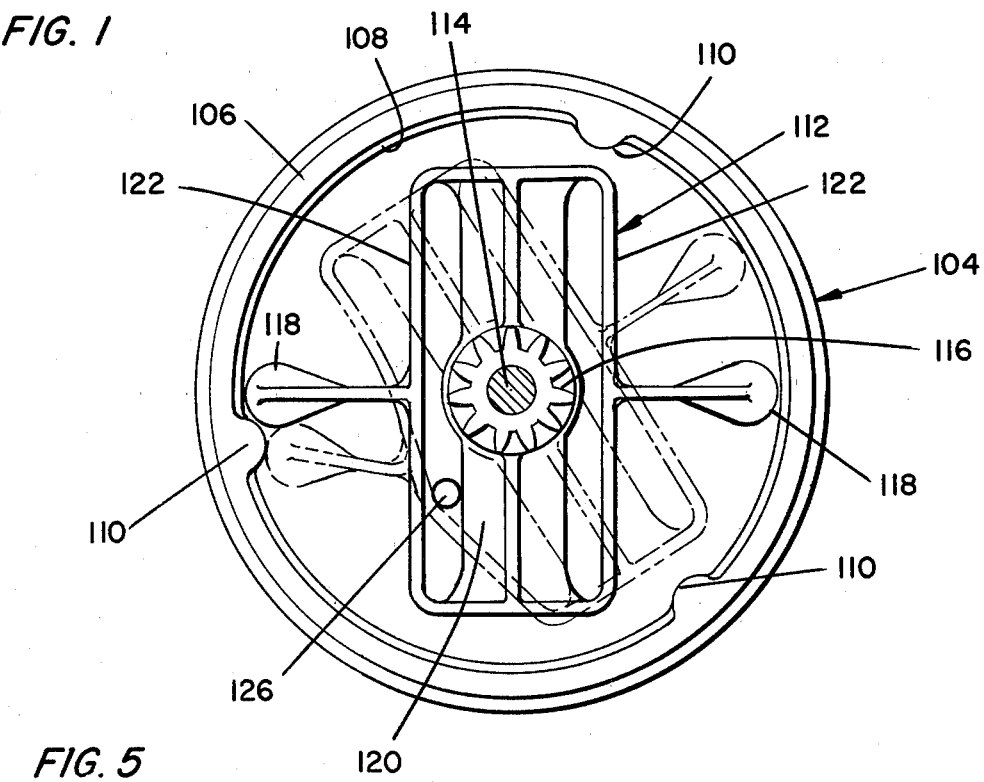
FIG. 5 is a side elevational view of the flywheel mechanism as viewed generally along line 5—5 of FIG. 4.

Referring to FIG. 5, the flywheel driving arrangement includes the three ridge portions 110 about the inner periphery of recess 108 of flywheel 104 with the flywheel coupling device having two tongue portions 118 diametrically opposed. The main body portion 120 of the flywheel coupling device 112 is generally rectangular and provided with spaced integral deflectable leaf portions 122 on opposite sides of elongate openings 124, the tongue portions 118 being formed at the general midpoints of leaf portions 122 to provide resilience and permit deflection. A drive pin 126 is secured within the recess 108 of flywheel 104, the pin 126 being positioned within one elongated slot 124 for abuttingly engaging the main body portion 120 of flywheel coupling device 112 to thereby drive the same. Since the main driving force of the flywheel is by virtue of the pinion 116, in the event of sudden stopping of the mechanism, a tongue portion 118 will ride over the ridge portion 110 to the dotted line position of flywheel coupling device 112, with the adjacent leaf portion 122 being deflected outwardly, thereby providing shock absorbing action.

Referring again to FIG. 3, a brief description of the shearing and punching operation will be described. The tabletop or working surface 16 is provided with an elongated slot 128 and an aligned short slot 130 with the combined shear and punch member 18 having a punch portion 132 configured for passing through slot 130, and a shear blade portion 134 configured for passing through slot 128. The combined shear and punch member 18 is generally L-shaped with the shear blade 134 being configured on the undersurface of the short arm thereof. The long arm is provided with an elongate generally rectangular opening 136 with the punch portion 132 extending downwardly into the opening 136 adjacent the midpoint of the upper edge of the opening 136. The lower end of the member 18 is provided with an enlarged circular opening 138 having a suitable sleeve 140 positioned therein for rotatably engaging an enlarged eccentric lobe 142 integrally formed as part of the manually depressible button 30, the lobe 142 being generally circular in cross section but having the center thereof displaced from the center of the cap portion 144 of button member 30, the center of cap portion 144 being the axis of rotation of button 30 as will hereinafter be described. This eccentric rotation reciprocates the combined shear and punch member 18 during rotation of button 30 to permit punch portion 132 to pass through slot 130 and simultaneously permit shear blade 134 to pass through slot 128. The direction of rotation of button 30 is counter-clockwise as indicated by the arrow adjacent thereto. The button 30 includes the cap portion 144, the eccentric lobe portion 142 and an enlarged generally disc-shaped flange portion 146 having a plurality of integrally formed inwardly extending ratchet teeth 148 formed on the opposite surface thereof, the ratchet teeth 148 totaling three in number displced 120° apart. The lobe portion 142 is also provided with an outwardly extending tab portion 150 which coacts with an interior portion of the housing for maintaining the button 30 depressed for one complete revolution (see also FIG. 7).

Figure 4:
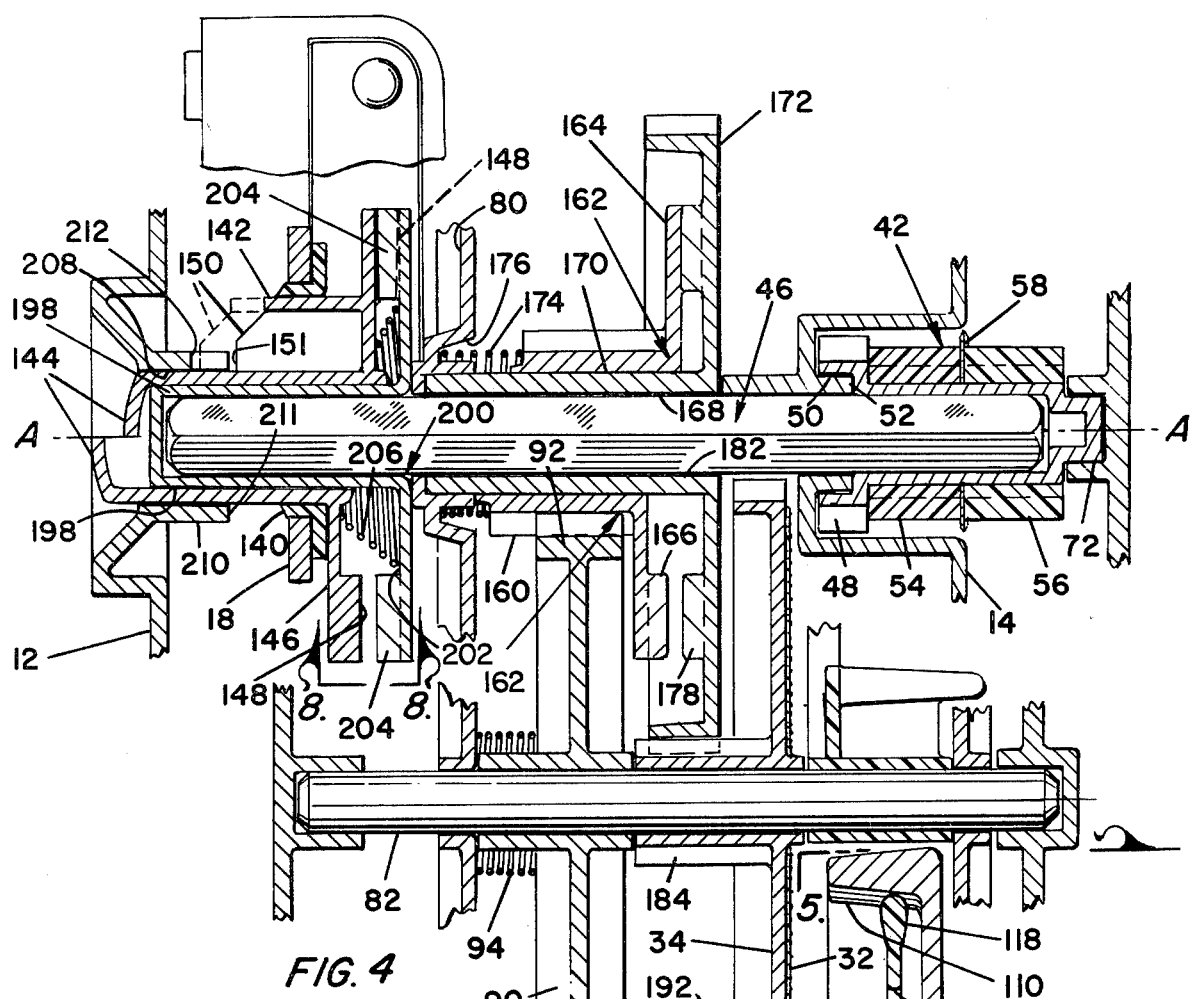
FIG. 4 is a sectional view of the woodworking apparatus taken generally along the broken line 4—4 of FIG. 3 with the flywheel rotated into plan elevation for illustrative purposes and component parts illustrated in the operative and inoperative positions along line A—A thereof.
Figure 8:
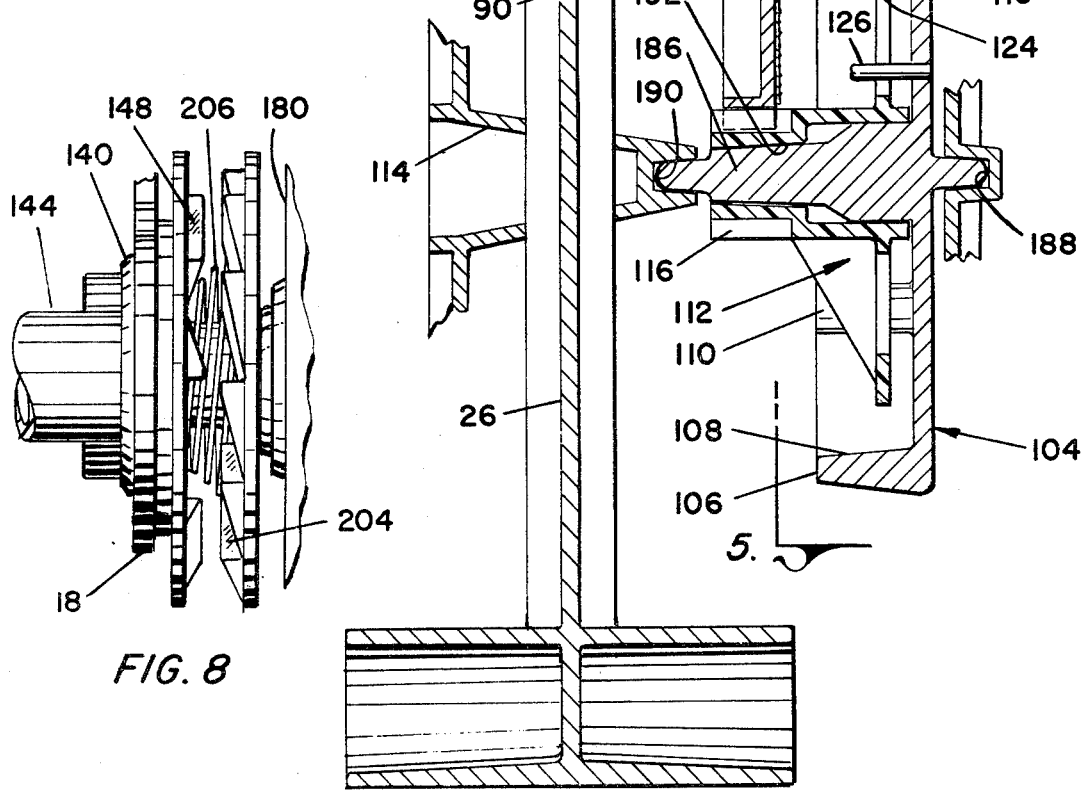
FIG. 8 is a cross sectional view taken generally along line 8—8 of FIG. 4.

Referring now to FIG. 4, the details pertaining to the operating mechanism will now be described. FIG. 4 illustrates in cross section the functional components as viewed along line 4—4 of FIG. 3, with the view along the broken line extending from the center of shaft 82 through the center of shaft 114 being rotated into alignment with the part of broken line 4—4 extending from the center of shaft 82 through the center of button 30. The horizontal line designated A—A through the center of square shaft 46 is used to illustrate on one side thereof certain components in the inoperative condition and on the other side thereof the same components shifted into the operative position. These certain components will be discussed hereinafter.

The power transmission within the apparatus 10 is initiated by repeatedly depressing handle 26 with the sector gear 92 thereof engaging the pinion portion 160 of a ratchet member generally designated 162, the ratchet member 162 having a large diameter discshaped portion 164 having ratchet teeth 166 axially extending about the periphery of a surface thereof. The ratchet member 162 is provided with a circular aperture 168 rotatably mounted on a cylindrical extension 170 of an intermediate gear 172 and axially slidable relative thereto. The ratchet member 162 is normally urged to the right as viewed in FIG. 4 by means of a compression spring 174 interposed about extension 170 with one end thereof urging against the pinion portion 160 of ratchet member 162 and the other end thereof fitting within a recess 176 formed at the junction of two of the arm members 80 of the skeletal framework 76. The ratchet teeth 166 of ratchet member 162 are configured for engaging a mating set of ratchet teeth 178 formed on an inner surface of intermediate gear 172. As the handle 26 is depressed downwardly (see also FIG. 3), compression spring 174 urges ratchet member 162 to the right as viewed in FIG. 4 until the teeth 166 thereof engage the teeth 178 of intermediate gear 172, this position being the driving position depicted by the position of ratchet member 162 depicted above the line A—A. As handle 26 returns upwardly under force of torsion spring 94, the teeth 166 of ratchet member 162 slide over the teeth 178 of intermediate gear 172, this position generally corresponding to the position of ratchet member 162 depicted below the line A—A. By these ratchet coupling means, repeated depression of handle 26 provides unidirectional rotation to intermediate gear 172. Intermediate gear 172 is provided with a square aperture 182 for close frictional engagement and concurrent rotation with square shaft 46.

The teeth of intermediate gear 172 are in meshing engagement with a pinion portion 184 of gear member 34 which has the sanding disc 32 on the opposite surface thereof. The gear member 34 is rotatably coupled to shaft 82 and has the gear teeth thereof in meshing engagement with the pinion portion 116 of flywheel coupling device 112 to thereby impart rotation to flywheel 104 as previously described. As illustrated in FIG. 4, the flywheel 104 is provided with an elongate shaft portion 186 which is rotatably mounted within recesses 188 and 190 formed within the skeletal framework 76, the aperture 192 of flywheel coupling device 112 being mounted on the shaft portion 186 for rotation relative thereto to permit angular displacement of the parts as required by such stopping and as described previously in conjunction with FIG. 5.

With repeated despressions of handle 26, flywheel 104 is accelerated, and energy is stored therein for subsequent utilization to drive the working elements of the apparatus. With the rotary slitter member 42 direct coupled to square shaft 46 for concurrent rotation therewith, rotation of the intermediate gear 172 effectively drives the rotary slitting members 40 and 42. Similarly, the rotation of intermediate gear 172 imparted to the sanding disc gear 34 provides for operation of the sanding disc.

Referring now to FIGS. 2, 4, 7, and 8, the operation of the shear and punch member 18 will be described. Briefly, a ratchet clutch means is provided for selectively rotating the shear and punch member 18 through a single revolution upon depression of button member 30. As best illustrated in FIG. 4, the button member 30 is provided with a hollow interior having a circular cross section, this opening 196 encircling a projection 198 of a driven clutch member generally designated 200, the clutch member 200 having the projection 198 thereof fixedly coupled to one end of the square shaft 46. The clutch member 200 is provided with a discshaped flange portion 202 formed integrally therewith, the flange portion 202 having ratchet teeth 204 axially extending and disposed about the periphery of one surface thereof in facing relation to the ratchet teeth 148 of button member 30. Normally, the button member 30 is urged to the left by means of a compression spring 206 encircling the projection 198 and disposed between opposing surfaces of flange portion 202 of clutch member 200 and flange portion 146 of button member 30, this position being shown below line A—A of FIG. 4. In this position, the button member 30 is urged to the left by means of spring 206 with the teeth 148 thereof in spaced proximate relation to the ratchet teeth 204 of clutch member 200. The button member 30 thus remains stationary notwithstanding rotation of clutch member 200 and consequently the shear and punch member 18 remains stationary since the opening 138 thereof encircles the eccentric lobe 142 of button member 30.

As button member 30 is depressed, this position being indicated above the line A—A of FIG. 4, the ratchet teeth 148 thereof engage the ratchet teeth 204 of driven clutch member 200 to permit rotation of button member 30 through one cycle. This is accomplished by means of the cap portion 144 of button member 30 extending through an aperture 208 formed within housing half 12, the aperture 208 being encircled by a generally cylindrical sleeve member 210 formed integrally in housing half 12. The sleeve member 210 is provided with a V-shaped detent (see also FIG. 7) in the wall thereof, the V-shaped detent being positioned relative to the punch and shear member 18 so that with tab 150 of eccentric lobe 142 resting therein (as shown in dotted lines above the line A—A in FIG. 4) the member 18 is in the position illustrated in FIG. 1 with the button member 30 being in the position illustrated below the line A—A in FIG. 4. With the flywheel 104 rotating, the driven clutch member 200 will likewise be rotating and with button member 30 in its normal position, no shearing action takes place. As the button 30 is momentarily depressed to the position shown above line A—A, the opposing ratchet teeth 148 and 204 engage to rotate button member 30 in the counterclockwise direction as illustrated in FIG. 3 whereupon the edge 151 of tab 150 which is perpendicular to the axis of rotation rides upon the adjacent edge 211 of sleeve 210 formed within the housing thus keeping the ratchet teeth 148 and 204 in engagement until the edge 151 of tab 150 again passes into the V-shaped detent 212 of sleeve 210 under the force of spring 206 axially displacing button member 30 outwardly to its normal position. During this single cycle of operation, a work piece such as a slat 24 positioned within the openings 22 and 24 and resting on the working surface 16 will be either sheared or punched depending on the operation desired with the combined shear and punch member 18 being returned to its normal position illustrated in FIG. 1 at the completion of the cycle due to the indexing provided by the detent 212 coacting with the tab 150 of the eccentric lobe 142. Depending on the inertia and energy remaining in flywheel 104, additional operations may be performed on the slat 24 such as sanding or slitting.

The apparatus 10 according to the invention is compact, requires no source of electrical energy for operation, and provides four different woodworking operations capable of being performed by utilization of a flywheel powered device. The slat 24 can be sheared into smaller lengths, can have holes punched therein, can be split lengthwise or slit, and can be sanded, thus providing a variety of sizes and configuration of pieces which may be assembled into small houses, articles of furniture, or other types of structures depending on the imagination of the user. Although four machining tools, that is, a shear, a punch, a slitter, and a sander, have been illustrated, it is to be understood that other similar type machining tools can be provided for actuation by the flywheel of the apparatus to perform additional functions on slats or the like. While there has been shown and described a preferred embodiment, it is to be understood that various other adaptations and modifications may be made within the spirit and scope of the invention.

We claim:
1. In an apparatus for performing machining operations on an article of wood or the like, the combination comprising:
 a housing;
 a shaft member rotatably mounted within said housing;
 means within said housing for rotating said shaft member;
 a clutch member coupled to said shaft member for rotation therewith;
 a machining tool for performing a machining operation on said article; and
 another member mounted on said shaft member for axial displacement relative thereto, said another member in a first position being stationary relative to said housing and in a second axially displaced position engaging said clutch member for rotation therewith, said another member having eccentric means engaging said machining tool for reciprocating said machining tool in response to rotation of said another member in said second position.

2. The combination according to claim 1 wherein said another member is manually depressible and said housing and said another member include coacting means for providing a single rotation of said another member in response to momentary depression thereof with said clutch member rotating to provide one cycle of reciprocation of said machining tool.

3. The combination according to claim 2 wherein said another member is normally biased by a spring member away from said clutch member.

4. The combination according to claim 3 wherein said clutch member includes a projection encircling and frictionally engaging said shaft member, said projection having a generally circular outer cross section, and said another member has a generally hollow cap portion with a generally circular inner cross section for slidingly engaging said projection and for enabling said projection to rotate therein with said another member in said first position.

5. The combination according to claim 4 wherein said clutch member has a generally disc-shaped flange portion, said another member has a generally disc-shaped flange portion, the facing surfaces of said flange portions being provided with mating ratchet teeth means for selective engagement only with said another in said second position.

6. The combination according to claim 5 wherein said spring member is interposed between said facing surfaces of said flange portions.

7. The combination according to claim 6 wherein said another member has the cap portion thereof extending through an opening in a sleeve formed integrally with the interior of said housing, said sleeve is provided with detent means and said another member is provided with a tab portion for selectively engaging said detent means only in said first position.

8. The combination according to claim 1 wherein said means within said housing for rotating said shaft member includes a flywheel, a crank pivotally coupled within said housing, and ratchet means operatively connecting said crank to said flywheel for accelerating said flywheel in response to repeated pivoting of said crank.

9. The combination according to claim 8 wherein said machining tool is one of a punch member and a shear member.

10. The combination according to claim 8 wherein said housing includes a working surface and said machining tool is a generally L-shaped member having an arm thereof extending through said opening and aligned normally parallel to said surface.

11. The combination according to claim 10 wherein said arm is a shear member.

12. The combination according to claim 11 wherein the other arm of said generally L-shaped member is rotatably coupled to said eccentric means.

* * * * *